(12) United States Patent
Abe

(10) Patent No.: US 12,358,559 B2
(45) Date of Patent: Jul. 15, 2025

(54) VEHICLE BODY STRUCTURAL MEMBER AND METHOD FOR DESIGNING VEHICLE BODY STRUCTURAL MEMBER

(71) Applicant: NIPPON STEEL CORPORATION, Tokyo (JP)

(72) Inventor: Masahiko Abe, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 290 days.

(21) Appl. No.: 17/798,908

(22) PCT Filed: Feb. 18, 2021

(86) PCT No.: PCT/JP2021/006055
§ 371 (c)(1),
(2) Date: Aug. 11, 2022

(87) PCT Pub. No.: WO2021/166988
PCT Pub. Date: Aug. 26, 2021

(65) Prior Publication Data
US 2023/0093164 A1    Mar. 23, 2023

(30) Foreign Application Priority Data
Feb. 18, 2020 (JP) ................. 2020-025171

(51) Int. Cl.
  B62D 21/00    (2006.01)
  B62D 25/00    (2006.01)
  B62D 65/00    (2006.01)

(52) U.S. Cl.
  CPC ............. *B62D 21/00* (2013.01); *B62D 65/00* (2013.01); *B62D 25/00* (2013.01); *Y10T 428/12292* (2015.01)

(58) Field of Classification Search
None
See application file for complete search history.

(56) References Cited

U.S. PATENT DOCUMENTS

2019/0176211 A1*  6/2019  Otsuka .................. B62D 29/007

FOREIGN PATENT DOCUMENTS

EP    3 473 530 A1    4/2019
JP    2005-186777 A   7/2005

\* cited by examiner

*Primary Examiner* — Xiaobei Wang
(74) *Attorney, Agent, or Firm* — Birch, Stewart, Kolasch & Birch, LLP

(57) ABSTRACT

This vehicle body structural member is a vehicle body structural member (1) extending in a longitudinal direction, wherein, in at least a portion thereof in the longitudinal direction, a cross-section perpendicular to the longitudinal direction satisfies the Expressions (1) to (3).

$\sigma_{cr} > \sigma_y$    Expression (1)

$\sigma_{cr} = \dfrac{k\pi^2 E t^2}{12(1-\nu^2)b_f^2}$    Expression (2)

$k = 4.0\exp\left(-28\dfrac{R1t}{b_f b}\right)$    Expression (3)

8 Claims, 7 Drawing Sheets

VEHICLE BODY STRUCTURAL MEMBER AND METHOD FOR DESIGNING VEHICLE BODY STRUCTURAL MEMBER

TECHNICAL FIELD

The present disclosure relates to a vehicle body structural member and a method for designing a vehicle body structural member.

Priority is claimed on Japanese Patent Application No. 2020-025171, filed Feb. 18, 2020, the content of which is incorporated herein by reference.

BACKGROUND ART

Conventionally, for vehicle body structural members, hollow members that are made of steel sheets serving as materials and have predetermined cross-sectional shapes are used. These vehicle body structural members are required to realize reduction in weight and have sufficient load-bearing properties when an impact due to a collision or the like is applied. For this reason, in recent years, high strength steel sheets having high strength have been used as materials.

Patent Document 1 describes a technique in which, in a vehicle body structural member subjected to axial compression bending deformation, in order to realize a member having high axial compression bending strength, a surface subjected to compression deformation is convexly curved outward.

CITATION LIST

Patent Document

[Patent Document 1]
Japanese Unexamined Patent Application, First Publication No. 2005-186777

SUMMARY OF THE INVENTION

Problems to be Solved by the Invention

In the technique described in Patent Document 1 mentioned above, the shape of the surface subjected to compression deformation in a cross-sectional view of the member is only convexly curved outward, and effects of the cross-sectional shape including planes that are continuous with the curved surface on a bending proof stress of the entire member are not considered. In addition, when a material used for the vehicle body structural member becomes thinner and has a higher strength, an elastic buckling stress of the member may be lowered. For this reason, at a portion that receives a bending load, particularly a planar portion, elastic buckling may occur before a yield stress of the material is reached, which may lower the bending proof stress. However, conventional techniques including the technique described in Patent Document 1 do not set the cross-sectional shape of the member from such a viewpoint.

Thus, the present invention has been made in view of the above problems, and an object of the present invention is to provide a new and improved vehicle body structural member that can ensure a high bending proof stress and a method for designing the same.

Means for Solving the Problem

Specific aspects of the present disclosure are as follows.

(1) A first aspect of the present disclosure is a vehicle body structural member extending in a longitudinal direction thereof, wherein, in at least a portion in the longitudinal direction, a cross-section perpendicular to the longitudinal direction comprises: a maximum radius of curvature curved portion having the maximum radius of curvature R1 in units of mm among a plurality of curved portions; a reference flat portion having the longest cross-sectional length $b_f$ in units of mm among flat portions, which are connected to the maximum radius of curvature curved portion, and whose end portions on sides opposite to end portions connected to the maximum radius of curvature curved portion are connected to the curved portions whose centers of circles of curvature are on the same side as a centroid of the cross-section with respect to the cross-section; and a small radius of curvature curved portion having a radius of curvature R2, which is less than or equal to 50% of the radius of curvature R1 of the maximum radius of curvature curved portion in units of mm, wherein the small radius of curvature curved portion is disposed on a side opposite to the reference flat portion with a reference line interposed therebetween, which passes through the centroid of the shape of the cross-section and is a straight line parallel to the reference flat portion, and wherein the following Expressions (1) to (3) are satisfied,

[Math. 1]
$$\sigma_{cr} > \sigma_y \qquad \text{Expression (1)}$$

[Math. 2]
$$\sigma_{cr} = \frac{k\pi^2 E t^2}{12(1-v^2)b_f^2} \qquad \text{Expression (2)}$$

[Math. 3]
$$k = 4.0\exp\left(-28\frac{R1 t}{b_f b}\right) \qquad \text{Expression (3)}$$

here,

σcr: an elastic buckling stress of the reference flat portion in units of MPa

σy: a yield stress of the reference flat portion in units of MPa k: a buckling stress coefficient E: Young's modulus of the portion forming the reference flat portion in units of MPa t: a sheet thickness of the portion forming the reference flat portion in units of mm v: Poisson's ratio of the portion forming the reference flat portion $b_f$: a cross-sectional length of the reference flat portion in units of mm R1: a radius of curvature of the maximum radius of curvature curved portion in units of mm b: the maximum external dimension of a cross-section in a direction along the reference line in the cross-section in units of mm.

(2) The vehicle body structural member according to the above (1), wherein the cross-section may be present in a region of equal to or more than 50% of a total length thereof in the longitudinal direction.

(3) The vehicle body structural member according to the above (1) or (2), wherein the vehicle body structural member may further satisfy the following Expression (4).

[Math. 4]

$$\sigma_{cr} \times 0.9 > \sigma_y \quad \text{Expression (4)}$$

(4) the vehicle body structural member according to any one of the above (1) to (3), wherein a tensile strength of the reference flat portion may be equal to or more than 1180 MPa.

(5) the vehicle body structural member according to any one of the above (1) to (4), wherein the radius of curvature R1 may be equal to or more than 15 mm.

(6) The vehicle body structural member according to any one of the above (1) to (5), wherein a thickness of the reference flat portion may be 0.4 to 1.6 mm.

(7) A second aspect of the present disclosure is a method for designing a vehicle body structural member extending in a longitudinal direction thereof, wherein, in at least a portion in the longitudinal direction, a cross-section perpendicular to the longitudinal direction comprises: a maximum radius of curvature curved portion having the maximum radius of curvature R1 in units of mm among a plurality of curved portions; a reference flat portion having the longest cross-sectional length $b_f$ in units of mm among flat portions, which are connected to the maximum radius of curvature curved portion, and whose end portions on sides opposite to end portions connected to the maximum radius of curvature curved portion are connected to the curved portions whose centers of circles of curvature are on the same side as a centroid of the cross-section with respect to the cross-section; and a small radius of curvature curved portion having a radius of curvature R2, which is less than or equal to 50% of the radius of curvature R1 of the maximum radius of curvature curved portion in units of mm, wherein the small radius of curvature curved portion is disposed on a side opposite to the reference flat portion with a reference line interposed therebetween, which passes through the centroid of the shape of the cross-section and is a straight line parallel to the reference flat portion, and the vehicle body structural member is designed to satisfy the following Expressions (1) to (3),

[Math. 5]

$$\sigma_{cr} > \sigma_y \quad \text{Expression (1)}$$

[Math. 6]

$$\sigma_{cr} = \frac{k\pi^2 E t^2}{12(1-v^2)b_f^2} \quad \text{Expression (2)}$$

[Math. 7]

$$k = 4.0\exp\left(-28\frac{R1t}{b_f b}\right) \quad \text{Expression (3)}$$

here,

σcr: an elastic buckling stress of the reference flat portion in units of MPa

σy: a yield stress of the reference flat portion in units of MPa k: a buckling stress coefficient E: Young's modulus of the portion forming the reference flat portion in units of MPa t: a sheet thickness of the portion forming the reference flat portion in units of mm v: Poisson's ratio of the portion forming the reference flat portion $b_f$: a cross-sectional length of the reference flat portion in units of mm R1: a radius of curvature of the maximum radius of curvature curved portion in units of mm b: the maximum external dimension of a cross-section in a direction along the reference line in the cross-section in units of mm.

Effects of the Invention

According to the present invention, it is possible to provide a vehicle body structural member that can ensure a high bending proof stress.

EMBODIMENTS FOR IMPLEMENTING THE INVENTION

Figure 1A:
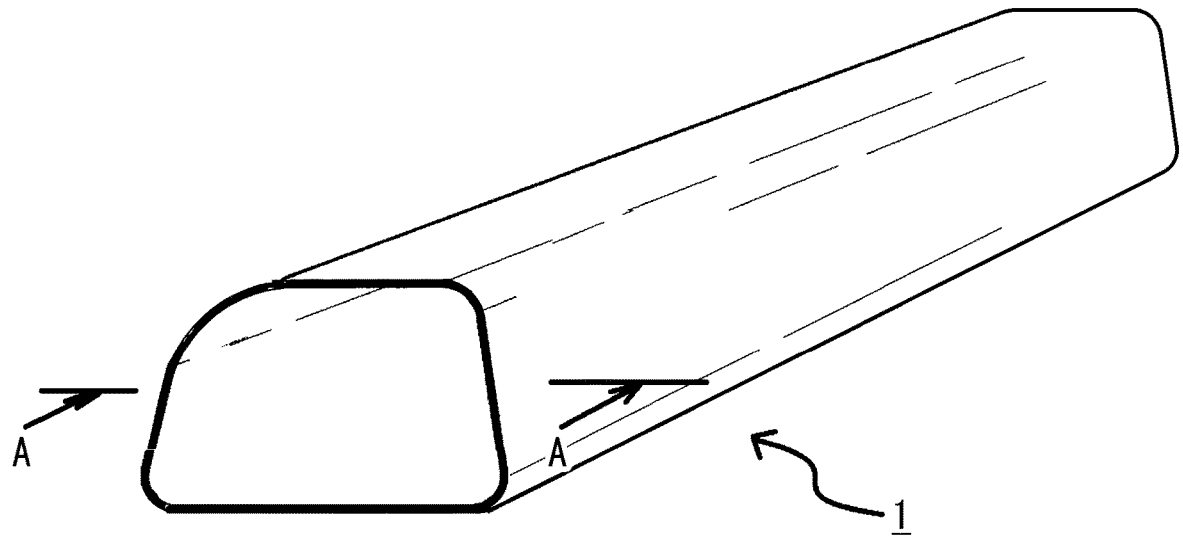
FIG. 1A is a perspective view showing a structural member 1 according to an embodiment of the present disclosure.

Hereinafter, the present invention will be described in detail on the basis of a vehicle body structural member according to a first embodiment and a method for designing a vehicle body structural member according to a second embodiment. In addition, in the present specification and the drawings, constituent elements having substantially the same functional configuration will be denoted by the same reference numeral, and repeated descriptions thereof will be omitted. Also, dimensions and ratios of each constituent element in the drawings do not represent the actual dimensions and ratios of each constituent element.

In the following description, an axial direction of the vehicle body structural member, that is, a direction in which an axis thereof extends is referred to as a longitudinal direction. Also, among directions perpendicular to the longitudinal direction, a direction along a surface of a top plate portion may be referred to as a width direction, and a direction perpendicular to the longitudinal direction and the width direction may be referred to as a vertical direction.

A "cross-sectional length" is a length in a circumferential direction in a cross-section of the vehicle body structural member perpendicular to the longitudinal direction.

A "centroid" is a centroid in the cross-section of the vehicle body structural member perpendicular to the longitudinal direction. A direction away from the centroid is defined as an outward direction, and a direction toward the centroid is defined as an inward direction.

A "flat portion" is a linear portion in the cross-section of the vehicle body structural member perpendicular to the longitudinal direction, specifically, a portion having a radius of curvature larger than the maximum external dimension of the cross-section. Also, in a case in which a plurality of linear portions are present at the same position in the width direction or the vertical direction, the plurality of linear portions are collectively referred to as one flat portion. Further, the maximum external dimension is the longest distance among distances between intersections between an extension line of one flat portion and each extension line of two flat portions extending continuously to the flat portion via a curved portion.

A "curved portion" is a portion of the cross-section of the vehicle body structural member perpendicular to the longitudinal direction, excluding flat portions, that is, a portion having a radius of curvature less than or equal to the maximum external dimension of the cross-section and is an arcuate portion that is convex in the outward direction or the inward direction of the vehicle body structural member. Accordingly, an R end is a boundary between a flat portion and a curved portion.

A radius of curvature of the curved portion may be obtained as follows. That is, in the cross-section of the vehicle body structural member perpendicular to the longitudinal direction, three points, i.e., two R ends, and a bending center point located equidistant along a surface from points of the two R ends on the curved portion of the surface, are obtained. By obtaining a curvature from these three points using a known mathematical method, the radius of curvature of the curved portion can be obtained. Also, the surface is an outer surface of a bent plate material. A radius of curvature of the flat portion can also be obtained using the same calculation method as the radius of curvature of the curved portion.

First Embodiment

Hereinafter, a vehicle body structural member 1 (hereinafter referred to as a structural member 1) according to a first embodiment of the present disclosure will be described.

FIG. 1A is a perspective view showing the structural member 1 according to the present embodiment as an example. The structural member 1 is a structural member of a vehicle body, in other words, a frame member. The vehicle body is, for example, a vehicle body of an automobile.

As shown in FIG. 1A, the structural member 1 is a hollow tubular member extending in the longitudinal direction.

The structural member 1 can be formed by applying various known machining techniques to a plate material such as a steel sheet. As an example, the structural member 1 may be formed by forming a blank material into a predetermined shape using cold or hot press working and joining its end portions together.

The structural member 1 preferably has a tensile strength equal to or more than 1180 MPa, and more preferably equal to or more than 1500 MPa in a reference flat portion 13, which will be described later.

In addition, the sheet material may be, for example, a steel sheet having a thickness equal to or more than 0.4 mm and less than or equal to 1.6 mm from the viewpoint of shock absorption characteristics and weight reduction required for the structural member 1.

A material of a material sheet may be a metal such as aluminum in addition to steel.

Figure 1B:
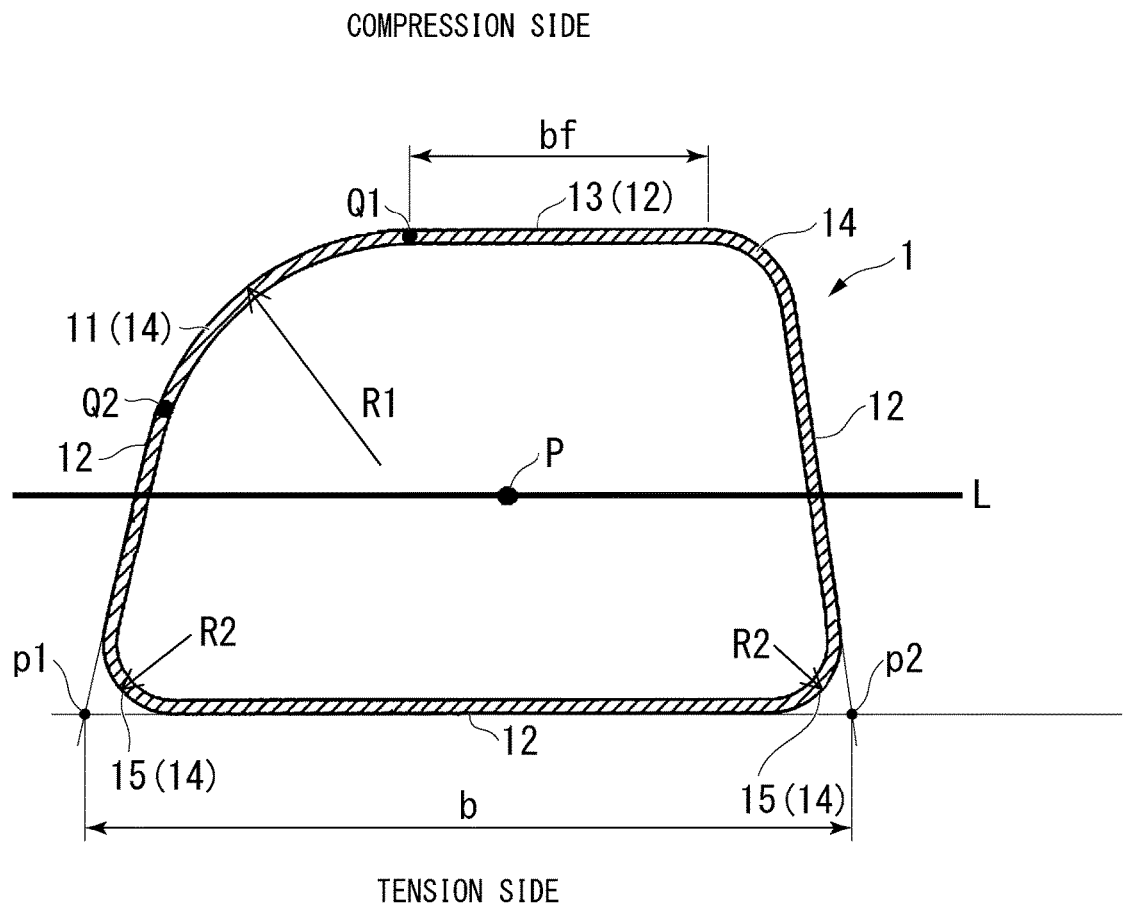
FIG. 1B is a cross-sectional view along line A-A in FIG. 1A.

FIG. 1B shows a cross-section perpendicular to the longitudinal direction (cross-section A-A in FIG. 1A) in a central portion of the structural member 1 in the longitudinal direction.

As shown in FIG. 1B, the cross-section of the structural member 1 perpendicular to the longitudinal direction constitutes a closed cross-section formed by four curved portions 14 and four flat portions 12.

In the present application, a curved portion having the maximum radius of curvature in the cross-section perpendicular to the longitudinal direction is defined as a "maximum radius of curvature curved portion." Accordingly, in the structural member 1 according to the present embodiment, a curved portion having the maximum radius of curvature R1 in units of mm among the four curved portions 14 shown in FIG. 1B is the maximum radius of curvature curved portion 11.

The maximum radius of curvature curved portion 11 is a portion that has higher rigidity against out-of-plane deformation caused by a compressive stress than the flat portions 12, and thus has high rigidity against a bending load and is less likely to elastically buckle. In order to increase a bending proof stress, the radius of curvature R1 is preferably equal to or more than ¼ of the maximum external dimension b. The radius of curvature R1 may be equal to or more than 15 mm.

On the other hand, if the radius of curvature R1 is too large, the section modulus decreases and an excellent bending proof stress cannot be obtained. Accordingly, the radius of curvature R1 is preferably less than or equal to ½ of the maximum external dimension b.

Further, in the present application, a flat portion having a larger cross-sectional length among flat portions, which are respectively connected to the R ends at both ends of the maximum radius of curvature curved portion, and whose end portions on sides opposite to end portions connected to the maximum radius of curvature curved portion are connected to the curved portions whose centers of circles of curvature are on the same side as a centroid of the cross-section with respect to the cross-section, is defined as the "reference flat portion." In two flat portions 12 of the structural member 1 according to the present embodiment, a cross-sectional length of the flat portion 12 connected to an R end Q1 is longer than a cross-sectional length of the flat portion 12 connected to an R end Q2. Accordingly, among the two flat portions connected to the R ends Q1 and Q2 shown in FIG. 1B in the structural member 1 according to the present embodiment, the flat portion 12 connected to the R end Q1 is the reference flat portion 13. The reference flat portion 13 is a flat portion of the two flat portions 12 connected to the maximum radius of curvature curved portion 11, in which elastic buckling due to a bending load is likely to occur. Accordingly, when the cross-sectional length $b_f$ of the reference flat portion 13 becomes smaller, elastic buckling near the reference flat portion 13 can be inhibited. Accordingly, in order to improve the bending proof stress, the cross-sectional length $b_f$ of the reference flat portion 13 is preferably less than or equal to 45 mm when a sheet thickness thereof is more than 1.0 mm and less than or equal to 1.6 mm, preferably less than or equal to 28.1 mm when the sheet thickness is more than 0.8 mm and less than or equal to 1.0 mm, and preferably less than or equal to 22.5 mm when the sheet thickness is less than or equal to 0.8 mm.

On the other hand, when the cross-sectional length $b_f$ of the reference flat portion 13 is too small, a total cross-sectional length (a total circumferential length) of the structural member 1 cannot be ensured, and thus a section modulus thereof decreases. In order to ensure the bending proof stress of the entire structural member 1, the cross-sectional length $b_f$ of the reference flat portion 13 is preferably equal to or more than 5 mm. The cross-sectional length $b_f$ of the reference flat portion 13 is preferably less than or equal to 22.5 mm when the sheet thickness is more than 1.0 mm and less than or equal to 1.6 mm, preferably less than or equal to 14.1 mm when the sheet thickness is more than 0.8 mm and less than or equal to 1.0 mm, and preferably less than or equal to 11.3 mm when the sheet thickness is less than or equal to 0.8.

A reference line L shown in FIG. 1B is a straight line that passes through a centroid P of the cross-sectional shape and is parallel to the reference flat portion 13. In the structural member 1 according to the present embodiment, two small radius of curvature curved portions 15 having a radius of curvature R2 (mm), which is less than or equal to 50% of the radius of curvature R1 (mm) of the maximum radius of curvature curved portion 11, are disposed on a side opposite to the reference flat portion 13 with the reference line L interposed therebetween. As compared with the maximum radius of curvature curved portion 11, the small radius of curvature curved portions 15 are portions that have larger distances to the R end, which is a closer one of the two R ends from the reference line L, and have large contributions to a bending rigidity. When the structural member 1 receives a bending load such that the reference flat portion 13 bends inward, a bending stress in which a region in which the reference flat portion 13 is present becomes a compression side and a region on a side opposite thereto becomes a tension side when the reference line L serves as a reference is generated. Also, the reference flat portion 13 that receives the bending load, which causes it to bend inward, is referred to as a load receiving surface.

Further, the small radius of curvature curved portion 15 has the radius of curvature R2 which is less than or equal to 50% of the radius of curvature R1 of the maximum radius of curvature curved portion 11 in units of mm, and thus the entire cross-section can ensure high bending rigidity while elastic buckling on the compression side can be inhibited.

Accordingly, by providing the reference flat portion 13 at a portion at which the bending load is assumed to be input due to a collision or the like, the structural member 1 according to the present embodiment can exhibit an excellent bending proof stress.

As described above, the structural member 1 according to the present embodiment has the maximum radius of curvature curved portion 11 and the small radius of curvature curved portions 15, and thus a high bending proof stress can be ensured. The small radius of curvature curved portions 15 are on the side opposite to the reference flat portion 13 with the reference line L interposed therebetween, and the bending proof stress increases as the distance from the reference line L becomes longer.

Here, the structural member 1 can ensure a high bending proof stress when the following Expressions (1) and (2) are satisfied.

[Math. 8]
$$\sigma_{cr} > \sigma_y \quad \text{Expression (1)}$$

[Math. 9]
$$\sigma_{cr} = \frac{k\pi^2 E t^2}{12(1-v^2)b_f^2} \quad \text{Expression (2)}$$

Here,
σcr: an elastic buckling stress of the reference flat portion 13 in units of MPa
σy: a yield stress of the reference flat portion 13 in units of MPa
k: a buckling stress coefficient
E: Young's modulus of the portion forming the reference flat portion 13 in units of MPa
t: a sheet thickness of the portion forming the reference flat portion 13 in units of mm
v: Poisson's ratio of the portion forming the reference flat portion 13
$b_f$: a cross-sectional length of the reference flat portion 13 in units of mm The Expression (2) shows the elastic buckling stress σcr of the reference flat portion 13. Accordingly, it can be said that, by satisfying the Expression (1), in other words, by making the elastic buckling stress σcr of the reference flat portion 13 larger than the yield stress σy, strength characteristics of the material can be reasonably utilized without causing elastic buckling of the reference flat portion 13, and a high bending proof stress can be ensured.

The Expression (2) is a calculation formula obtained by the present inventor who has newly found and derived the relationship that the elastic buckling stress σcr of the reference flat portion 13 increases as Young's modulus E, the sheet thickness t, and Poisson's ratio v of the reference flat portion 13 increase, and the cross-sectional length $b_f$ of the reference flat portion 13 decreases.

Here, the buckling stress coefficient k is a value determined from a differential equation of buckling of a flat sheet and an eigenvalue obtained from a bending shape satisfying the differential equation, and is obtained by the following Expression (3).

[Math. 10]
$$k = 4.0\exp\left(-28\frac{R1t}{b_f b}\right) \quad \text{Expression (3)}$$

Here,
R1: a radius of curvature of the maximum radius of curvature curved portion 11 in units of mm
b: the maximum external dimension of a cross-section in a direction along the reference line L in the cross-section in units of mm.

In a case in which a cross-section having a radius of curvature of the maximum radius of curvature curved portion of 0 mm (R1=0) is assumed, radii of curvature of other curved portions in the cross-section are also 0 mm from the definition of the maximum radius of curvature curved portion. Accordingly, since the reference flat portion is sandwiched by a ridge line having a radius of curvature of 0 mm, it can be assumed that constraint conditions of the reference flat portion are constraint conditions of free rotation and translational fixation. In this case, the buckling stress coefficient is 4.0.

However, the present inventor has noted that, in a case in which the radius of curvature R1 of the maximum radius of curvature curved portion 11 is designed to be large to some extent in order to improve an axial compression proof stress as in the structural member 1 according to the present embodiment, translations of widthwise end portions of the reference flat portion 13 adjacent to the maximum radius of curvature curved portion 11 are not completely fixed. In addition, the present inventor has found that, by setting a true buckling stress coefficient k of the reference flat portion 13 to be lower than 4.0, a more accurate elastic buckling stress σcr can be calculated.

The present inventor has further pursued the research on the basis on the finding and found that the buckling stress coefficient k correlates with the radius of curvature R1 of the maximum radius of curvature curved portion 11 in units of mm, the sheet thickness t of the portion forming the reference flat portion 13 in units of mm, the cross-sectional length $b_f$ of the reference flat portion 13 in units of mm, and a length of the reference line L in the cross-section in units of mm, and derived the Expression (3).

In addition, when the constraint conditions of the reference flat portion are free rotation and free translation, the buckling stress coefficient is 0.425. Accordingly, in a case in which a value of the buckling stress coefficient k obtained by the Expression (3) is below 0.425, a value of k may be 0.425.

Further, in order to perform a design to prevent elastic buckling more reliably, a value of 90% of the elastic buckling stress σcr is preferably set to be larger than the yield stress σy. That is, it is preferable that the structural member 1 further satisfy the following Expression (4).

[Math. 11]

$$\sigma_{cr} \times 0.9 > \sigma_y \quad \text{Expression (4)}$$

Figure 7:
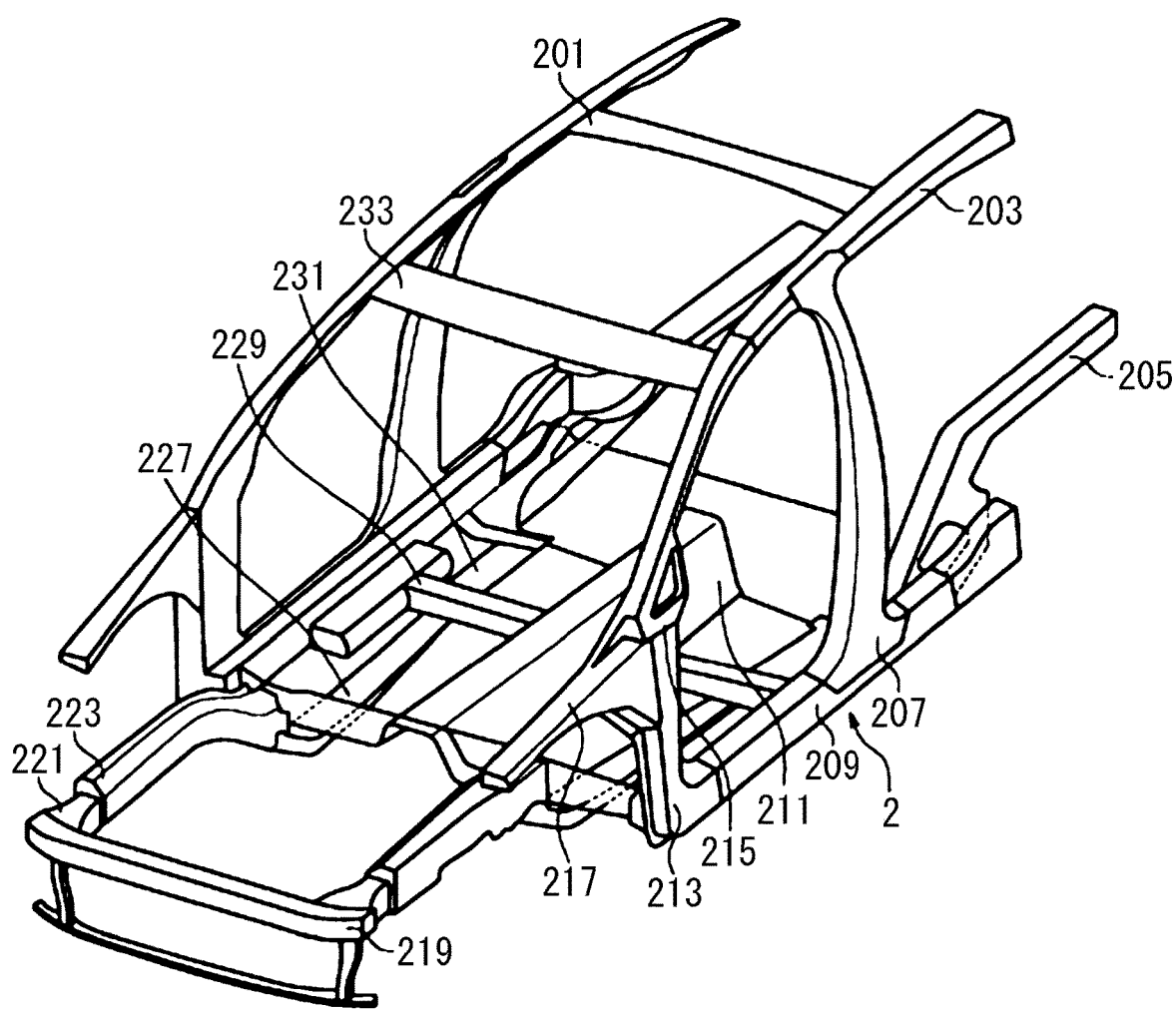
FIG. 7 is a perspective view showing frames of an automobile as an example to which a structural member is applied.

As described above, a preferred embodiment of the present disclosure has been described in detail. From here, an application example of the structural member of the present disclosure will be described with reference to FIG. 7. FIG. 7 is a diagram showing frames 2 of an automobile as an example to which the structural member is applied. The structural member may constitute frames 2 of the automobile as a cabin frame or a shock absorbing frame.

Examples of application of the structural member according to the present disclosure include a roof center reinforcement 201, a roof side rail 203, a B pillar 207, a side sill 209, a tunnel 211, an A pillar lower 213, an A pillar upper 215, a kick reinforcement 227, a floor cross member 229, an under reinforcement 231, a front header 233, and the like. In addition, examples of application of the structural member according to the present disclosure as a shock absorbing frame include a rear side member 205, an apron upper member 217, a bumper reinforcement 219, a crash box 221, a front side member 223, and the like. In addition to the above, the structural member according to the present disclosure may be applied to a door impact beam or the like as a reinforcing material provided inside a door of an automobile. In short, the structural member of the present disclosure can be applied to any portion as long as a bending load can act thereon.

In a case in which the structural member 1 is used as a frame member of a vehicle body in this way, the structural member 1 has a high bending proof stress, and thus its deformation at the time of a collision can be reduced. In addition, deformability is improved, and thus the inside of the frames can be protected.

Although the structural member 1 according to the first embodiment of the present disclosure has been described above, the technical scope of the present invention is not limited to the above-described embodiment, and various changes can be made without departing from the spirit of the present invention.

First Modified Example

Figure 2:
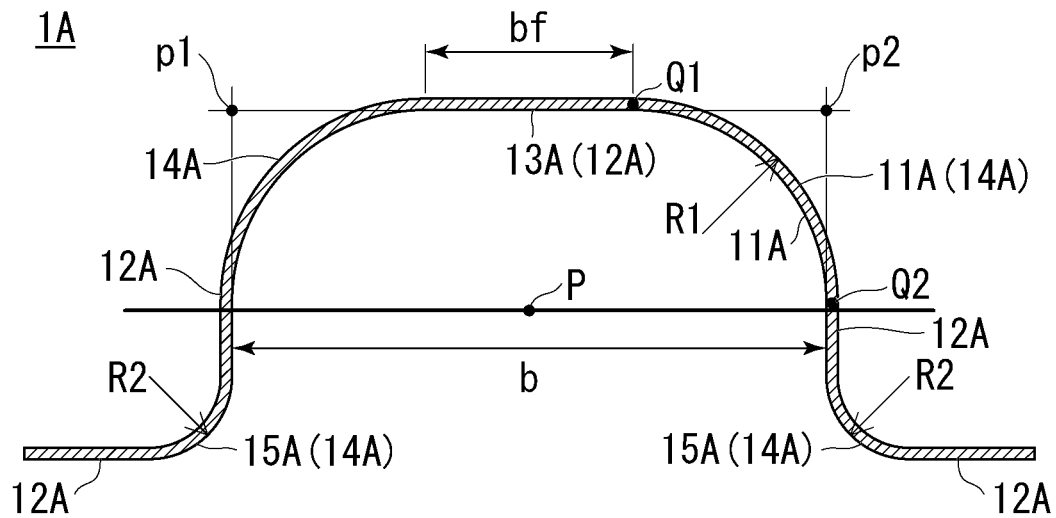
FIG. 2 is a cross-sectional view showing a cross-section perpendicular to a longitudinal direction of a vehicle body structural member 1A according to a modified example.

For example, the structural member 1 described above is a member whose cross-section perpendicular to the longitudinal direction is a tubular closed cross-section, but it may be a member whose cross-section perpendicular to the longitudinal direction is a substantially hat-shaped open cross-section, such as a structural member 1A according to a modified example shown in FIG. 2, Specifically, as shown in FIG. 2, a cross-section of the structural member 1A perpendicular to the longitudinal direction constitutes a substantially hat-shaped open cross-section formed by four curved portions 14A and five flat portions 12A. Among the five flat portions 12A, flat portions 12A each having one end serving as a free end may be referred to as flange portions, flat portions 12A connected to the flange portions via curved portions 14A may be referred to as vertical wall portions, and a flat portion 12A connected to the vertical wall portions via curved portions 14A at end portions of the wall portions on sides opposite to end portions thereof connected to the flange portions may be referred to as a top plate portion.

In the cross-section of the structural member 1A, as shown in FIG. 2, a curved portion 14A having the maximum radius of curvature R1 in units of mm among the four curved portions 14A is a maximum radius of curvature curved portion 11A. In the structural member 1A, radii of curvature of two of the four curved portions 14A are the maximum, and in this case, one of the two curved portions 14A is regarded as the maximum radius of curvature curved portion 11.

The flat portion 12A connected to an R end Q1 at an end portion of the maximum radius of curvature curved portion 11A has one end on a side opposite to the other end connected to the R end Q1, which is connected to a curved portion 14A whose center of a circle of curvature is on the same side as a centroid P of the cross-section. On the other hand, the flat portion 12A connected to an R end Q2 at an end portion of the maximum radius of curvature curved portion 11A has one end on a side opposite to the other end connected to the R end Q2, which is connected to a curved portion 14A whose center of a circle of curvature is on a side opposite to the centroid P of the cross-section. Accordingly, the flat portion 12A having the larger cross-sectional length out of the flat portions 12A connected to the R ends Q1 and Q2 at both ends of the maximum radius of curvature curved portion 11A is a reference flat portion 13A. In other words, the reference flat portion 13A is a flat portion 12A connected to the R end Q1 of the maximum radius of curvature curved portion 11A. In addition, in the structural member 1A, the reference flat portion 13A is the top plate portion. The reference line L shown in FIG. 2 is a straight line that passes through the centroid P of the cross-sectional shape of the cross-section perpendicular to the longitudinal direction of the structural member 1A and is parallel to the reference flat portion 13A. In the structural member 1A, two small radius of curvature curved portions 15A having a radius of curvature R2, which is less than or equal to 50% of the radius of curvature R1 of the maximum radius of curvature curved portion 11A in units of mm are disposed on a side opposite to the reference flat portion 13A with the reference line L interposed therebetween. The small radius of curvature curved portions 15A are portions having a larger bending proof stress than the maximum radius of curvature curved portion 11A. For this reason, when the structural member 1A receives a bending load, a bending stress in which a region in which the reference flat portion 13A is present becomes a compression side and a region on a side opposite thereto becomes a tension side with the reference line L serving as a reference is likely to occur.

Further, the small radius of curvature curved portions 15A are also portions that have the radius of curvature R2, which is less than or equal to 50% of the radius of curvature R1 of the maximum radius of curvature curved portion 11A in units of mm, and thus exhibit an excellent bending proof stress.

Accordingly, by providing the reference flat portion 13A at a portion at which a bending load is assumed to be input due to a collision or the like, the structural member 1A can exhibit an excellent bending proof stress.

In addition, similarly to the structural member 1, in the structural member 1A as well, a high bending proof stress can be ensured in a case in which the above Expressions (1) to (3), preferably the above Expressions (1) to (4) are satisfied.

Figure 3:
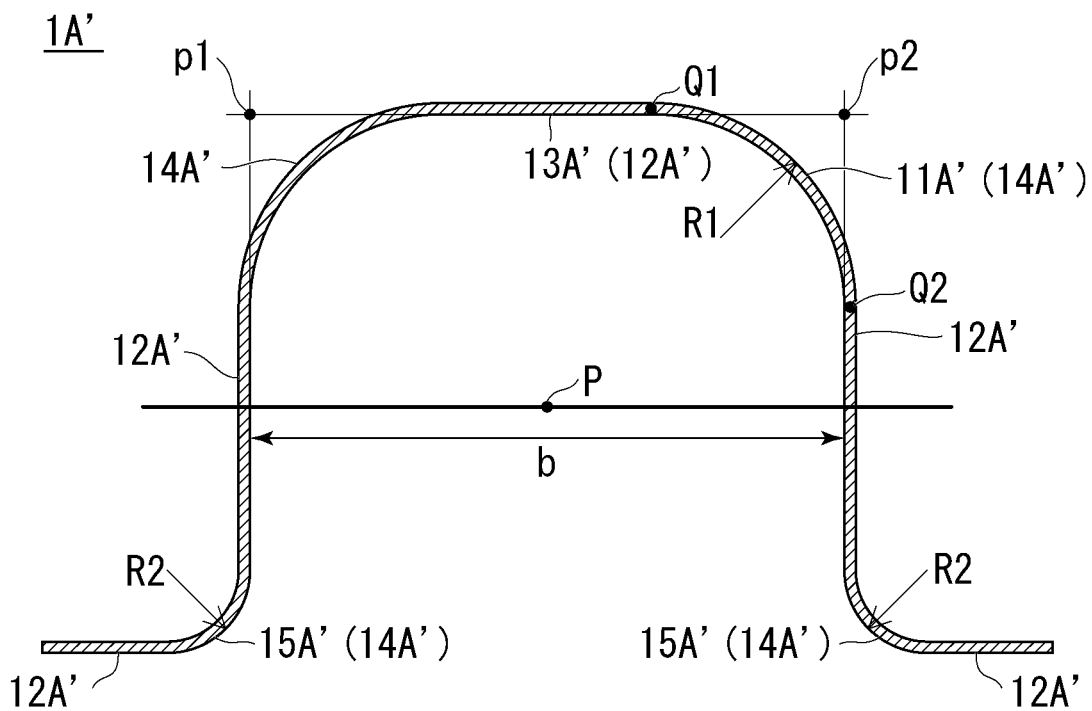
FIG. 3 is a cross-sectional view showing a cross-section perpendicular to a longitudinal direction of a vehicle body structural member 1A' according to a modified example.

Also, as shown in FIG. 3, in a case in which a cross-sectional length of a flat portion 12A', which is a vertical wall portion, is longer than a cross-sectional length of a flat portion 12A', which is a top plate portion, the flat portion 12A' which is the top plate portion is a reference flat portion 13A'.

Figure 4:
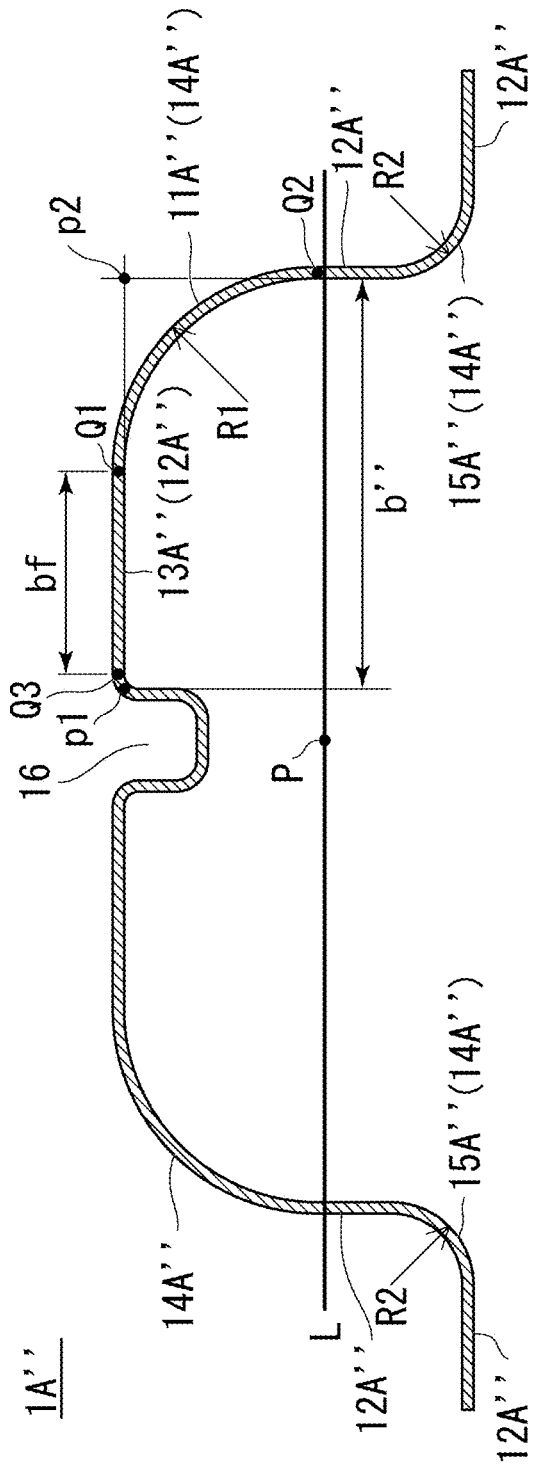
FIG. 4 is a cross-sectional view showing a cross-section perpendicular to a longitudinal direction of a vehicle body structural member 1A" according to a modified example.

Further, in the structural member according to the present disclosure, as in a structural member 1A" according to a modified example shown in FIG. 4, part of a flat portion 12A" serving as the top plate portion may have a recessed portion 16. Here, planes disposed on both sides of the recessed portion 16 in the width direction are collectively regarded as one flat portion 12A". Also, curved portions and flat portions constituting the recessed portion 16 are not included in the curved portions and the flat portions according to the present disclosure.

As shown in FIG. 4, a cross-section of the structural member 1A" perpendicular to the longitudinal direction constitutes an open cross-section formed by four curved portions 14A" and five flat portions 12A". Even in this case, a reference flat portion 13A" is the flat portion 12A" connected to an R end Q1 of a maximum radius of curvature curved portion 11A". A reference line L shown in FIG. 4 is a straight line that passes through a centroid P of the cross-sectional shape of the cross-section perpendicular to the longitudinal direction of the structural member 1A" and is parallel to the reference flat portion 13A". In the structural member 1A" as well, two small radius of curvature curved portions 15A" having a radius of curvature R2 which is less than or equal to 50% of a radius of curvature R1 of the maximum radius of curvature curved portion 11A" in units of mm are disposed on a side opposite to the reference flat portion 13A" with the reference line L interposed therebetween. In addition, in the structural member 1A" as well, similarly to the structural member 1, a high bending proof stress can be ensured in a case in which the above Expressions (1) to (3), preferably the above Expressions (1) to (4) are satisfied. However, in the structural member 1A" having the recessed portion 16 in the top plate portion, the longest cross-sectional length $b$ of the reference line L in the above Expression (4) is replaced with a distance $b'$ from an R end Q1 of a plane connected to the maximum radius of curvature curved portion 11A" in the reference flat portion 12A" to an R end Q3 of a plane connected to the maximum radius of curvature curved portion 11A" in the recessed portion 16. Also, in the structural member 1A" having the recessed portion 16 in the top plate portion, the maximum external dimension b of the cross-section in units of mm in the direction along the reference line L in the above Expression (4) is replaced with a distance b' from an intersection p1 between an extension line of a flat portion in the vertical direction in the recessed portion 16 connected to the reference flat portion 12A" and an extension line of the reference flat portion 13A" to an intersection p2 between an extension line of a flat portion 12A" which is a vertical wall portion and an extension line of the reference flat portion 13A".

Second Modified Example

Figure 5:
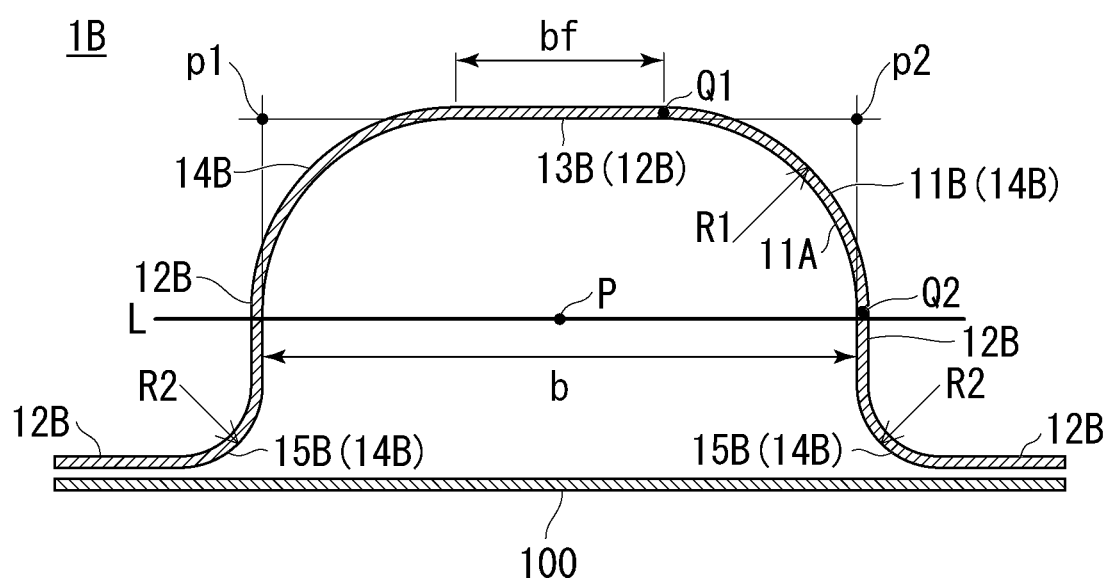
FIG. 5 is a cross-sectional view showing a cross-section perpendicular to a longitudinal direction of a vehicle body structural member 1B according to a modified example.

Further, as in a structural member 1B according to a modified example shown in FIG. 5, a steel sheet 100 may be joined to a flat portion 12B which is a flange portion.

Figure 6:
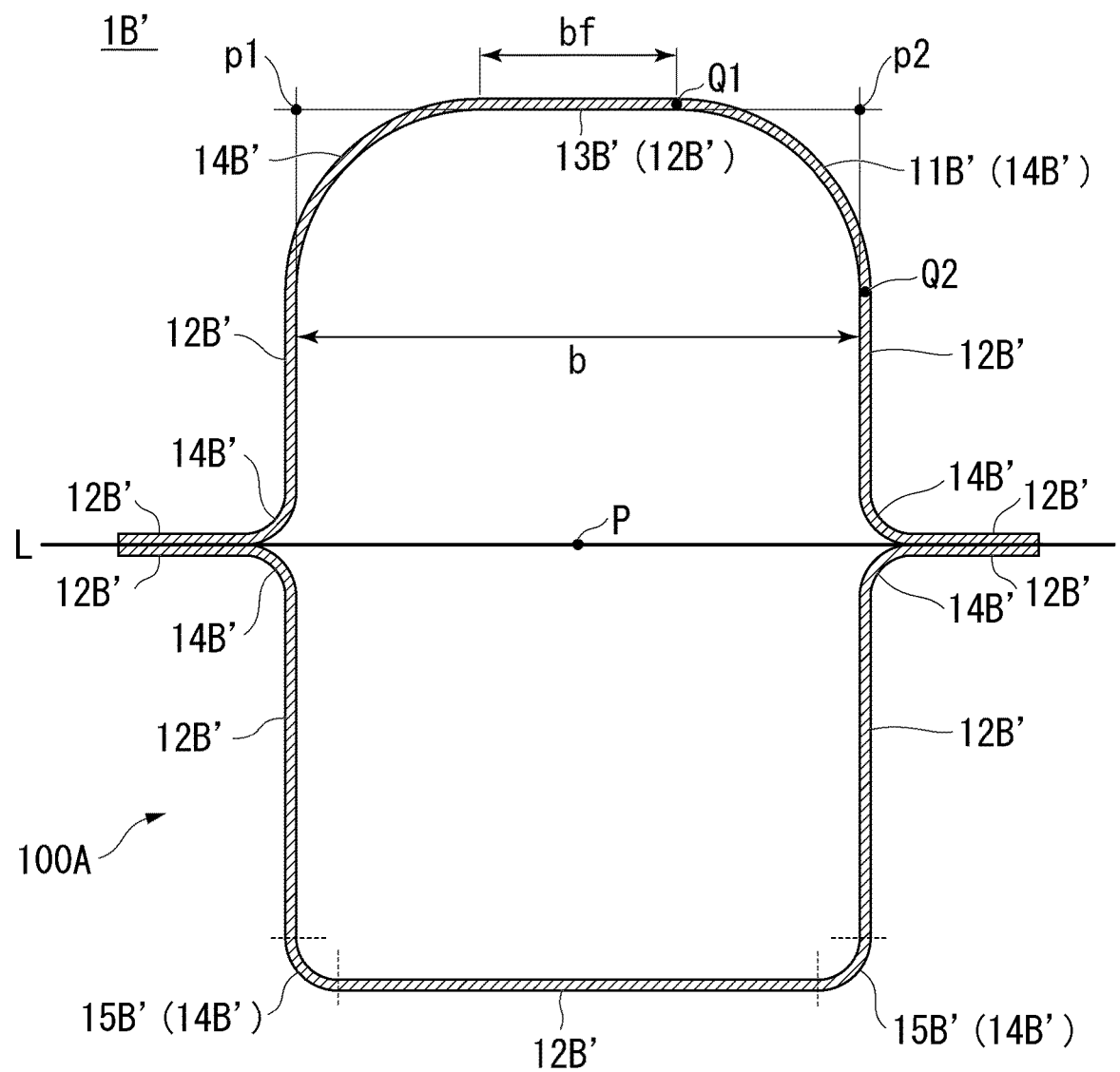
FIG. 6 is a cross-sectional view showing a cross-section perpendicular to a longitudinal direction of a vehicle body structural member 1B' according to a modified example.

Also, as in a structural member 1B' according to a modified example shown in FIG. 6, a hat type member 100A or the like may be joined instead of the steel sheet 100.

Specifically, as shown in FIG. 6, a cross-section of the structural member 1B' perpendicular to the longitudinal direction constitutes a closed cross-section formed by eight curved portions 14B' and ten flat portions 12B'.

As shown in FIG. 6, in the cross-section of the structural member 1B', a curved portion 14B' of the eight curved portions 14B' that has a maximum radius of curvature R1 in units of mm is a maximum radius of curvature curved portion 11B'. In the structural member 1B', radii of curvature of two of the eight curved portions 14B' are the maximum, but in this case, one of the two curved portions 14B' is regarded as the maximum radius of curvature curved portion 11B'.

A flat portion 12B' connected to an R end Q1 at an end portion of the maximum radius of curvature curved portion 11B' has one end on a side opposite to the other end connected to the R end Q1, which is connected to a curved portion 14B' whose center of a circle of curvature is on the same side as a centroid P of the cross-section. On the other hand, a flat portion 12B' connected to an R end Q2 at an end portion of the maximum radius of curvature curved portion 11B' has one end on a side opposite to the other end connected to the R end Q2, which is connected to a curved portion 14B' whose center of a circle of curvature is on a side opposite to the centroid P of the cross-section. Accordingly, the flat portion 12B' whose one end is connected to the curved portion 14B' curved in a direction (inward direction) opposite to the maximum radius of curvature curved portion 11B' out of the two flat portions 12B' connected to the R ends Q1 and Q2 at both ends of the maximum radius of curvature curved portion 11B' is a reference flat portion 13B'. In other words, the reference flat portion 13B' is a flat portion 12B' connected to the R end Q1 of the maximum radius of curvature curved portion 11B'. A reference line L shown in FIG. 6 is a straight line that passes through the centroid P of the cross-sectional shape of the cross-section perpendicular to the longitudinal direction of the structural member 1B' and is parallel to the reference flat portion 13B'. In the structural member 1B', two small radius of curvature curved portions 15B' having a radius of curvature R2, which is less than or equal to 50% of a radius of curvature R1 of the maximum radius of curvature curved portion 11B' in units of mm are disposed on a side opposite to the reference flat portion 13B' with the reference line L interposed therebetween. In the structural member 1B', the small radius of curvature curved portion 15B' refers to each of the two curved portions 14B', which are the farthest from the reference line L, among four curved portions 14B' that are disposed on a side opposite to the reference flat portion 13B' with the reference line L interposed therebetween and have the radius of curvature R2, which is less than or equal to 50% of the radius of curvature R1 of the maximum radius of curvature curved portion 11B' in units of mm.

The structural members 1, 1A, 1A', 1A", 1B, and 1B' according to the first embodiment have uniform cross-sectional shapes over the total length, but they may not have uniform cross-sectional shapes over the total length, and it is sufficient that a portion of the cross-section satisfying the Expressions (1) to (3), preferably the Expressions (1) to (4) is present in part of the total length in the longitudinal direction. More preferably, the portion of the cross-section satisfying the Expressions (1) to (3), preferably the Expressions (1) to (4), is present preferably in a region equal to or more than 50% of the total length in the longitudinal direction, and more preferably equal to or more than 80%.

The structural member 1 according to the first embodiment has one maximum radius of curvature curved portion 11, but may have a plurality of maximum radius of curvature curved portions 11 as shown in FIGS. 2 to 6, for example. In that case, any one curved portion can be regarded as the maximum radius of curvature curved portion 11.

The structural member 1 according to the first embodiment has two small radius of curvature curved portions 15, but may have at least one small radius of curvature curved portion 15.

The structural member 1 according to the first embodiment has two flat portions connected to the maximum radius of curvature curved portion 11, but may have one flat portion connected to the maximum radius of curvature curved portion 11. That is, one end portion of the maximum radius of curvature curved portion 11 may be directly connected to another curved portion or may be a free end. In that case, one flat portion connected to the maximum radius of curvature curved portion 11 is the reference flat portion 13.

A second embodiment of the present disclosure is a method for designing a structural member.

The method for designing a structural member according to the present embodiment is a method for designing the structural member according to the first embodiment, and the structural member is designed to satisfy the Expressions (1) to (3).

Specifically, by performing design modification such as changing a cross-sectional shape and a material of the structural member and adding a reinforcing member to satisfy the Expressions (1) to (3), costs required for the design can be reduced.

EXAMPLES

Effects of the present invention will be specifically described below on the basis of examples.

In each of Experiments Nos. 1 to 9, numerical analysis was performed for a hollow member that is made of a steel sheet having a sheet thickness of 1.0 mm, a tensile strength of 1180 MPa, a yield stress σy of 943 MPa, a Poisson's ratio of 0.3, and a Young's modulus of 206000 MPa, has a length of 184.0 mm, and has a uniform cross-section, and a bending proof stress thereof was evaluated.

Figure 8:
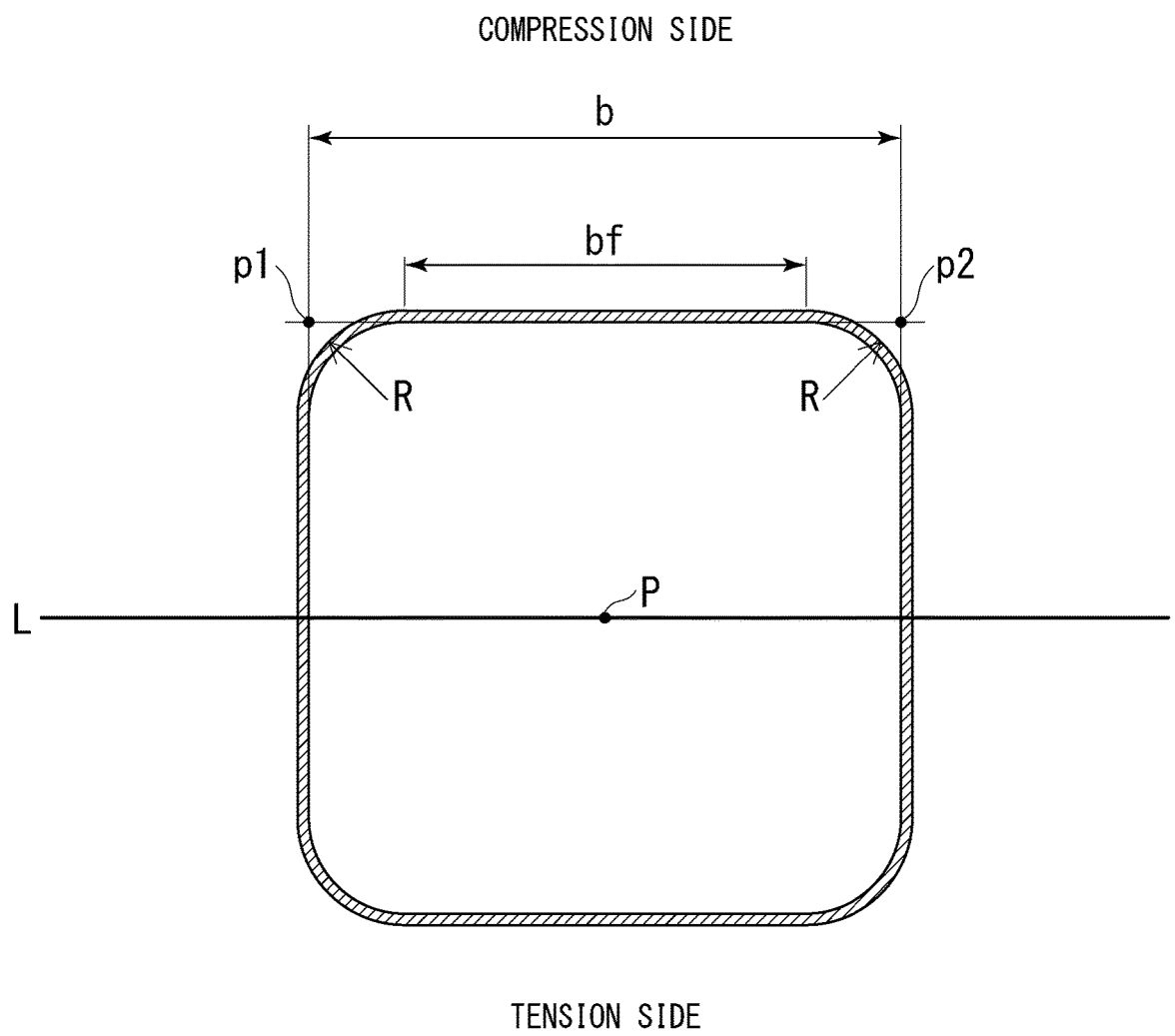
FIG. 8 is a diagram schematically showing an example of the cross-section perpendicular to the longitudinal direction of the vehicle body structural member according to an example.

As shown in FIG. 8, a shape of a cross-section of Experiment No. 1 perpendicular to the longitudinal direction was formed in a cross-sectional shape having an outer shape (the maximum outer dimension) b of 46.0 mm and a substantially rectangular shape in which a radius of curvature of each of four corner portions is 2.0 mm (that is, the maximum radius of curvature R1=2.0 mm).

In Experiment Nos. 2 to 7, numerical analysis was performed for the cross-sectional shape of the hollow member of Experiment No. 1 by changing radii of curvature of only two corner portions on the compression side among the four corner portions to 5.0 mm, 10.0 mm, 11.0 mm, 15.0 mm, 18.0 mm, and 20.0 mm while fixing the outer shape (maximum external dimension) b, and the bending proof stress was evaluated. The changed radii of curvature of the corner portions correspond to the maximum radius of curvature R1. Further, radii of curvature of the corner portions whose radii of curvature are not changed correspond to R2. Accordingly, in Experiment Nos. 2 to 7, R2=2.0 null.

In Experiment No. 8, numerical analysis was performed by changing the maximum radius of curvature R1 to 18.0 mm and the radii of curvature R2 of two corner portions on the tension side to 8.5 mm.

In Experiment No. 9, numerical analysis was performed by changing the maximum radius of curvature R1 to 18.0 mm and the radii of curvature R2 of the two corner portions on the tension side to 9.5 mm.

In each of the experimental examples, the length of the longest cross-sectional length $b_f$ has a different value in accordance with the fact that the radii of curvature of the two corner portions on the compression side are changed while the maximum outer diameter dimension b is fixed.

The bending proof stress of Experiment No. 1 in which radii of curvature of four curved portions are equal was set as a reference, cases in which a bending proof stress is larger than the bending proof stress of Experiment No. 1 were evaluated as B, among them, a case in which a bending proof stress is the largest was evaluated as A, cases in which a bending proof stress is smaller than the bending proof stress of Experiment No. 1 were evaluated as C, and A and B were set as acceptance criteria. The bending proof stress was calculated using the following method. That is, a pure bending analysis performed by rotating an end portion of a member was performed to obtain a bending moment M-deflection angle θ diagram, and the maximum value of the bending moment M in the range in which the deflection angle θ is 0 rad.<θ<0.1 rad. was set as the bending proof stress. The deflection angle θ is an angle formed by an axis of the member before deformation and an axis of the deformed member at both ends of the member in the longitudinal direction.

A shell element was used for an element constituting the member, an element type thereof was a complete integration element, and five integration points were provided in the sheet thickness direction. An element size of the flat portion was 2.0 mm×2.0 mm, and an element size of the curved portion was 2.0 mm×0.7 mm. A physical property type of the material constituting the member was a multi-linear approximate isotropic elasto-plastic body, and an equivalent stress-equivalent composition strain relationship obtained from results of a tensile test of a 1180 MPa class steel sheet was defined. The yield stress was 943 MPa. In this analysis, initial imperfections were ignored.

TABLE 1

| | σy [MPa] | R1 [mm] | R2/R1 [%] | K [—] | σcr [MPa] | σcr × 0.9 [MPa] | Determination of Expression (1) | Determination of Expression (4) | Bending proof stress | Classification |
|---|---|---|---|---|---|---|---|---|---|---|
| No. 1 | 943 | 2.0 | 100 | 3.89 | 410 | 369 | NG | NG | — | Reference example |
| No. 2 | 943 | 5.0 | 40.0 | 3.68 | 528 | 475 | NG | NG | C | Comparative example |

TABLE 1-continued

| | σy [MPa] | R1 [mm] | R2/R1 [%] | K [—] | σcr [MPa] | σcr × 0.9 [MPa] | Determination of Expression (1) | Determination of Expression (4) | Bending proof stress | Classification |
|---|---|---|---|---|---|---|---|---|---|---|
| No. 3 | 943 | 10.0 | 20.0 | 3.17 | 872 | 785 | NG | NG | C | Comparative example |
| No. 4 | 943 | 11.0 | 18.2 | 3.03 | 978 | 880 | OK | NG | B | Present inventive example |
| No. 5 | 943 | 15.0 | 13.3 | 2.26 | 1644 | 1480 | OK | OK | A | Present inventive example |
| No. 6 | 943 | 18.0 | 11.1 | 1.34 | 2490 | 2241 | OK | OK | B | Present inventive example |
| No. 7 | 943 | 20.0 | 10.0 | 0.53 | 2720 | 2448 | OK | OK | B | Present inventive example |
| No. 8 | 943 | 18.0 | 47.2 | 1.34 | 2490 | 2241 | OK | OK | B | Present inventive example |
| No. 9 | 943 | 18.0 | 52.8 | 1.34 | 2490 | 2241 | OK | OK | C | Comparative example |

In Experiment Nos. 2 and 3, elastic buckling occurred in the reference flat portion because the Expression (1) was not satisfied, and a high bending proof stress could not be exhibited.

On the other hand, in Experiment Nos. 4 to 8 in which the value of the radius of curvature R1 of the maximum radius of curvature curved portion was set to 11.0 mm or more, elastic buckling did not occur because the Expression (1) was satisfied, and thus a compressive stress equivalent to the yield stress could be secured in the reference flat portion, and an excellent bending proof stress could be exhibited.

In particular, in Experiment No. 5 in which the value of the radius of curvature R1 of the maximum radius of curvature curved portion was set to 15.0 mm, the Expression (4) was satisfied in addition to the Expression (1), so that a more excellent bending proof stress could be exhibited.

However, in Experiment Nos. 6 to 8 in which the value of the radius of curvature R1 of the maximum radius of curvature curved portion was increased to 18.0 mm or more, a section modulus decreased, so that a bending proof stress as good as Experiment No. 5 could not be exhibited.

In Experiment No. 9, R2/R1 was more than 50%, which is a ratio of the radius of curvature R2 of the small radius of curvature curved portion to the radius of curvature R1 of the maximum radius of curvature curved portion, and thus elastic buckling occurred in the reference flat portion, and a high bending proof stress could not be exhibited.

INDUSTRIAL APPLICABILITY

According to the present invention, it is possible to provide a new and improved vehicle body structural member that can ensure a high bending proof stress, and a method for designing the same.

BRIEF DESCRIPTION OF THE REFERENCE SYMBOLS

1, 1A, 1A', 1A", 1B, 1B' Structural member
11, 11A, 11A", 11B, 11B' Maximum radius of curvature curved portion
12, 12A, 12A", 12B, 12B' Flat portion
13, 13A, 13A", 13B, 13B' Reference flat portion
14, 14A, 14A", 14B, 14B' Curved portion
15, 15A, 15A", 15B, 15B' Small radius of curvature curved portion
100 Steel sheet
100A Hat-shaped steel sheet

The invention claimed is:

1. A vehicle body structural member extending in a longitudinal direction thereof,
   wherein, in at least a portion in the longitudinal direction, a cross-section perpendicular to the longitudinal direction comprises:
   a maximum radius of curvature curved portion having the maximum radius of curvature R1 in units of mm among a plurality of curved portions;
   a reference flat portion having the longest cross-sectional length br in units of mm among plane portions, which are connected to the maximum radius of curvature curved portion, and whose end portions on sides opposite to end portions connected to the maximum radius of curvature curved portion are connected to the curved portions whose centers of circles of curvature are on the same side as a centroid of the cross-section with respect to the cross-section; and
   a small radius of curvature curved portion having a radius of curvature R2, which is less than or equal to 50% of the radius of curvature R1 of the maximum radius of curvature curved portion in units of mm,
   wherein the small radius of curvature curved portion is disposed on a side opposite to the reference flat portion with a reference line interposed therebetween, which passes through the centroid of the shape of the cross-section and is a straight line parallel to the reference flat portion,
   wherein the following Expressions (1) to (3) are satisfied,

[Math. 1]

$$\sigma_{cr} > \sigma_y \qquad \text{Expression (1)}$$

[Math. 2]

$$\sigma_{cr} = \frac{k\pi^2 E t^2}{12(1-v^2)b_f^2} \qquad \text{Expression (2)}$$

-continued

[Math. 3]

$$k = 4.0\exp\left(-28\frac{R1t}{b_f b}\right)$$ Expression (3)

here,

σcr: an elastic buckling stress of the reference flat portion in units of MPa

σy: a yield stress of the reference flat portion in units of MPa k: a buckling stress coefficient E: Young's modulus of the portion forming the reference flat portion in units of MPa t: a sheet thickness of the portion forming the reference flat portion in units of mm v: Poisson's ratio of the portion forming the reference flat portion $b_f$: a cross-sectional length of the reference flat portion in units of mm R1: a radius of curvature of the maximum radius of curvature curved portion in units of mm b: the maximum external dimension of a cross-section in a direction along the reference line in the cross-section in units of mm, and wherein the vehicle body structural member is a hollow tubular member extending in the longitudinal direction.

2. The vehicle body structural member according to claim 1, wherein the reference flat portion is a load receiving surface to which a load from an outside is applied.

3. The vehicle body structural member according to claim 1, wherein the cross-section is present in a region equal to or more than 50% of a total length thereof in the longitudinal direction.

4. The vehicle body structural member according to claim 1, wherein the vehicle body structural member further satisfies the following Expression (4),

[Math. 4]

$$\sigma_{cr} \times 0.9 > \sigma_y$$ Expression (4).

5. The vehicle body structural member according to claim 1, wherein a tensile strength of the reference flat portion is equal to or more than 1180 MPa.

6. The vehicle body structural member according to claim 1, wherein the radius of curvature R1 is equal to or more than 15 mm.

7. The vehicle body structural member according to claim 1, wherein a sheet thickness of the reference flat portion is 0.4 to 1.6 mm.

8. A method comprising:

forming a vehicle body structural member having, in at least a portion in the longitudinal direction, a cross-section perpendicular to the longitudinal direction that comprises: a maximum radius of curvature curved portion having the maximum radius of curvature R1 in units of mm among a plurality of curved portions; a reference flat portion having the longest cross-sectional length br in units of mm among plane portions, which are connected to the maximum radius of curvature curved portion, and whose end portions on sides opposite to end portions connected to the maximum radius of curvature curved portion are connected to the curved portions whose centers of circles of curvature are on the same side as a centroid of the cross-section with respect to the cross-section; and a small radius of curvature curved portion having a radius of curvature R2, which is less than or equal to 50% of the radius of curvature R1 of the maximum radius of curvature curved portion in units of mm, wherein the small radius of curvature curved portion is disposed on a side opposite to the reference flat portion with a reference line interposed therebetween, which passes through the centroid of the shape of the cross-section and is a straight line parallel to the reference flat portion, wherein the vehicle body structural member is made to satisfy the following Expressions (1) to (3),

[Math. 5]

$$\sigma_{cr} > \sigma_y$$ Expression (1)

[Math. 6]

$$\sigma_{cr} = \frac{k\pi^2 E t^2}{12(1-v^2)b_f^2}$$ Expression (2)

[Math. 7]

$$k = 4.0\exp\left(-28\frac{R1t}{b_f b}\right)$$ Expression (3)

here,

σcr: an elastic buckling stress of the reference flat portion in units of MPa

σy: a yield stress of the reference flat portion in units of MPa k: a buckling stress coefficient E: Young's modulus of the portion forming the reference flat portion in units of MPa t: a sheet thickness of the portion forming the reference flat portion in units of mm v: Poisson's ratio of the portion forming the reference flat portion $b_f$: a cross-sectional length of the reference flat portion in units of mm R1: a radius of curvature of the maximum radius of curvature curved portion in units of mm b: the maximum external dimension of a cross-section in a direction along the reference line in the cross-section in units of mm, and wherein the vehicle body structural member is a hollow tubular member extending in the longitudinal direction.

* * * * *